(12) United States Patent
Coustet et al.

(10) Patent No.: US 7,166,360 B2
(45) Date of Patent: Jan. 23, 2007

(54) GLAZING PROVIDED WITH A STACK OF THIN LAYERS FOR SOLAR PROTECTION AND/OR HEAT INSULATION

(75) Inventors: Valérie Coustet, Montmorency (FR); Nicolas Nadaud, Gentilly (FR); Frédéric Barrieres, Chatou (FR); Jean-Pierre Brochot, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 114 days.

(21) Appl. No.: 10/450,162

(22) PCT Filed: Dec. 12, 2001

(86) PCT No.: PCT/FR01/03955

§ 371 (c)(1),
(2), (4) Date: Nov. 21, 2003

(87) PCT Pub. No.: WO02/48065

PCT Pub. Date: Jun. 20, 2002

(65) Prior Publication Data

US 2005/0123772 A1    Jun. 9, 2005

(30) Foreign Application Priority Data

Dec. 15, 2000  (FR) .................... 00 16404

(51) Int. Cl.
   *B32B 17/06* (2006.01)
(52) U.S. Cl. .............. 428/432; 428/428; 428/697; 428/698; 428/699; 428/701; 428/702; 428/704
(58) Field of Classification Search .............. 428/428, 428/432, 697, 698, 699, 701, 702, 704
See application file for complete search history.

(56) References Cited

U.S. PATENT DOCUMENTS

| 4,710,433 | A | * | 12/1987 | Rowe et al. | ................. 428/623 |
|---|---|---|---|---|---|
| 5,557,462 | A | | 9/1996 | Hartig et al. | ............... 359/585 |
| 5,718,980 | A | * | 2/1998 | Koch et al. | ................. 428/428 |
| 5,834,103 | A | | 11/1998 | Bond et al. | ................. 428/216 |
| 5,948,538 | A | | 9/1999 | Brochot et al. | ............. 428/432 |
| 6,045,896 | A | * | 4/2000 | Boire et al. | ................. 428/216 |
| 6,071,606 | A | * | 6/2000 | Yamazaki et al. | .......... 428/325 |
| 6,610,410 | B1 | * | 8/2003 | Ebisawa et al. | ............ 428/432 |

FOREIGN PATENT DOCUMENTS

| EP | 0347965 | 12/1989 |
|---|---|---|
| EP | 0611213 | 8/1994 |
| EP | 0638528 | 2/1995 |
| EP | 0678484 | 10/1995 |
| GB | 2279365 | 1/1995 |
| GB | 2315496 | 2/1998 |
| WO | WO99/05072 | 2/1999 |

OTHER PUBLICATIONS

U.S. Appl. No. 10/483,989, filed Jan. 23, 2004, Nadaud et al.
U.S. Appl. No. 10/576,724, filed Apr. 21, 2006, Labrousse et al.
U.S. Appl. No. 10/577,049, filed Apr. 24, 2006, Labrousse et al.

* cited by examiner

*Primary Examiner*—Jennifer C. McNeil
*Assistant Examiner*—G. Blackwell
(74) *Attorney, Agent, or Firm*—Oblon, Spivak, McClelland, Maier & Neustadt, P.C.

(57) ABSTRACT

The subject of the invention is glazing comprising at least one transparent substrate provided with a stack of thin layers consisting of an alternation of n functional layers having reflection properties in the infrared and/or the solar radiation range and of n+1 coatings composed of one or more layers made of a dielectric, so that each functional layer is placed between two coatings. At Least one layer absorbent in the visible is inserted between two layers of dielectric of at least one of the said coatings.

26 Claims, No Drawings

GLAZING PROVIDED WITH A STACK OF THIN LAYERS FOR SOLAR PROTECTION AND/OR HEAT INSULATION

FIELD OF THE INVENTION

The invention relates to transparent substrates, in particular made of rigid inorganic material such as glass (or organic material such as a rigid or flexible polymer substrate), the said substrates being coated with a stack of thin layers comprising at least one layer having a metallic-type behaviour able to act on solar radiation and/or long-wavelength infrared radiation.

The invention relates more particularly to the use of such substrates to manufacture thermal-insulation and/or solar-protection glazing. This glazing is intended to equip both buildings and vehicles, with a view in particular to decreasing the air-conditioning load and/or to reducing excessive overheating caused by the ever growing extent of glazed surfaces in passenger compartments.

BACKGROUND OF THE INVENTION

A known type of multilayer stack for giving the substrates such properties consists of at least one metallic layer, such as a silver layer, which is placed between two coatings of dielectric material of the metal-oxide type. The stack is generally obtained by a succession of deposition steps carried out using a vacuum technique, such as sputtering, optionally assisted by a magnetic field. Two very thin metal layers may also be provided on either side of the silver layer, the subadjacent layer acting as a tie layer for nucleation and the overlayer as a protective layer or "sacrificial" layer so as to prevent degradation of the silver if the oxide layer which is on top of it is deposited by sputtering in the presence of oxygen.

Stacks of this type, having one or two base layers of silver, are thus known from European Patents EP-0 611 213, EP-0 678 484 et EP-0 638 528.

Also known from Patent EP-0 847 965 is a stack consisting of two silver layers, designed so as to be able to undergo a heat treatment of the bending or toughening type without any substantial optical change, thanks to the use of oxygen barrier layers of the silicon nitride type and of layers for stabilizing the silver layers.

Finally, a stack consisting of two silver layers of very different thicknesses is known from Patent EP-0 844 219, making it possible to obtain glazing having a solar factor Lowered to at Least 32% (the solar factor SF is the ratio of the total energy entering a room through the glazing in question to the incident solar energy).

In general, but more particularly in the field of double glazing for buildings, it is advantageous to be able to adjust the light transmission Level of the glazing within a certain range without correspondingly having to completely reconfigure the stack of thin layers each time.

Solutions have already been proposed to meet this objective: in Patent FR-2 751 666 it is proposed to insert, between the glass and the first dielectric layer, an absorbent layer based on iron oxide. In Patent FR-2 708 262 it is proposed to insert an absorbent layer of the titanium nitride type, in contact with and above the silver layer. However, these solutions have a drawback in both cases if the stack of thin layers undergoes a heat treatment of the annealing, bending or toughening type: the absorbent layer will be significantly changed optically and/or make the multilayer stack in its entirety change optically.

This is because if the absorbent layer is in contact with the glass, or with the silver, it will, under the effect of heat, have a tendency to be oxidized, to deteriorate or to cause the adjacent layers to deteriorate in a more or less controllable manner. Thus, if the absorbent layer is in direct contact with the silver layer, it tends to destabilize it by oxidizing. If it is in contact with the glass, the layer will be modified by the diffusion of alkali metal ions coming from the glass.

SUMMARY OF THE INVENTION

The object of the invention is therefore to adjust the light transmission level of glazing provided with the stacks of thin layers described above without the aforementioned drawback, namely without causing a significant optical change in the stacks in the case of heat treatment.

Subsidiarily, the object of the invention is also to adjust the light transmission level and/or the selectivity of the glazing without correspondingly increasing too significantly the Level of external light reflection, preferably by Limiting this light reflection to a value of less than 20%.

Subsidiarily, the object of the invention is also to achieve this control of the light transmission level in a relatively simple manner and to be flexible to implement on an industrial scale.

DETAILED DESCRIPTION OF THE INVENTION

The subject of the invention is firstly glazing comprising at least one transparent substrate provided with a stack of thin layers consisting of an alternation of n functional layers having reflection properties in the infrared and/or the solar radiation range and of n+1 coatings composed of one or more layers made of a dielectric, so that each functional layer is placed between two coatings. Furthermore, at least one layer absorbent in the visible is inserted between two layers of dielectric of at least one of said coatings. In this configuration, the absorbent layer is neither in direct contact with the glass (thereby limiting the problems of oxygen and alkali metal diffusion under the effect of heat) nor in direct contact with the silver, thereby limiting the problems of deterioration of the silver layer caused by oxidation of the absorbent layer in contact with it, also under the effect of heat).

According to a first variant, the stack comprises a single functional layer placed between two coatings (the case where n=1).

According to a second variant, the stack comprises two functional layers alternating with three coatings (the case where n=2).

Avantageously, the functional layer or layers is or are based on silver or a metal alloy containing silver.

The absorbent layer (or the absorbent layers, the invention not being limited to the insertion of a single absorbent layer) may be chosen to be made of various materials: it may be a metal or a metal alloy of the Ti, Nb, Zr or NiCr type. It may also be a metal oxide, such as chromium oxide, iron oxide or a substoichiometric titanium or zinc oxide. Finally, it may be a metal nitride, such as titanium nitride, niobium nitride, zirconium nitride, chromium nitride or NiCr nitride.

Preferably, the thickness of the layer absorbent in the visible according to the invention is limited to small values: its thickness is advantageously less than or equal to 7 nm, and even rather, less than 5 or 3 nm. Usually, a thickness of between 1 and 3 nm is chosen: the first feature of the absorbent layer, mentioned above, is its absence of direct content with the glass or with the silver layer. Its second feature is its thinness: being very thin, it serves not to substantially lower the transmission, but rather to adjust it precisely by a few per cent.

According to a preferred embodiment of the invention, the layer absorbent in the visible lies between two dielectric layers, at least one of which is based on silicon nitride and/or aluminium nitride.

In a first variant, it Lies between two layers of one of these nitrides. This is in fact the optimum configuration for best "encapsulating" the absorbent layer, in order to isolate it from interactions with species running the risk of oxidizing it or degrading it (oxygen from the air or from the glass, or from the adjacent oxide layer, species diffusing from the silver layer under the effect of heat, etc.). This is because silicon nitrides and/or aluminium nitrides are known for their great chemical inertness, even at high temperature. Not only do they fulfil their usual role of dielectric with an optical function and with a silver-layer protection function (with a refractive index of about 2), but in addition they act as screen layers with respect to the layer absorbent in the visible.

In this configuration, a heat treatment of the annealing, bending or toughening type will not affect the absorbent layer (or affect it very little), the nitride layers forming an oxygen barrier and preventing it from oxidizing. Consequently, the variation in light transmission of the stack in its entirety will be no more substantial than that observed in the case of the stack in the absence of the absorbent layer (for example a change of at most 3%).

In a second variant, the layer absorbent in the visible is placed in the coating between a layer based on one or more metal oxides (or on silicon oxide) and an aluminium nitride and/or silicon nitride layer. The preferred configuration consists of one in which the oxide layer lies beneath the absorbent layer, and the nitride layer on top. According to this variant, there is direct contact between the absorbent layer and the oxide layer. Consequently, in the case of heat treatment, the absorbent layer may undergo oxidation, but, on the one hand, this is limited (especially when the layer is surmounted by a nitride isolating it from the oxygen of the atmosphere) and, on the other hand, this oxidation may prove to be beneficial in the sense that the absorbent layer "traps" the oxygen and thus preserves the other layers of the stack from oxidation. In this case, a variation in light transmission of the stack slightly greater than that in the case of the first variant, which may range up to 4 to 5% for example, is generally observed.

At least one of the coatings of the stack according to the invention comprises at least one layer of an oxide chosen from at Least one of the following oxides: zinc oxide, tin oxide, titanium oxide, silicon oxide, tantalum oxide, niobium oxide and zirconium oxide. As is explained in the aformentioned Patent EP-0 847 965, it is beneficial for the coatings to comprise both metal oxide layers and silicon nitride or aluminium nitride layers.

Thus, beneath at least one of the functional layers it is advantageous to have a layer based on zinc oxide, which tends to facilitate the adhesion and the crystallization of the silver-based functional layer and thus increase its quality and its high-temperature stability.

It also advantageous for the functional layer or at least one of the functional layers to be beneath a layer based on zinc oxide, in order to increase the adhesion.

To ensure that the stack is able to undergo, without excessive optical change, heat treatments of the annealing, toughening or bending type, it is preferable for each of the coatings to comprise at least one layer made of silicon nitride and/or aluminium nitride.

Optionally, a thin layer of metal or substoichiometric metal oxide (optionally nitrided) may be inserted between each functional layer and the coating placed above it and/or the coating placed beneath it. This may consist of titanium, niobium or nickel-chromium alloy layers which are optionally partially oxidized during the deposition of the stack (when the next layer is deposited by reactive sputtering in the presence of oxygen). They are usually referred to as tie layers (in the case of the layer underneath) or sacrificial or blocking layers (in the case of the layer on top).

According to a preferred variant, the stack comprises two silver-based functional layers with three coatings, and the layer absorbent in the visible is inserted into the "intermediate" coating, that is to say that placed between the two functional layers. It has been found that it is in this configuration that the absorbent layer appears to be the most stabilized/isolated and the appearance in external reflection of the glazing is best. An example of a stack according to the invention is as follows:

transparent substrate/$Si_3N_4$/ZnO/Ag/ZnO/$Si_3N_4$/TiN or NbN/$Ni_3N_4$/ZnO/Ag/ZnO/$Si_3N_4$ optionally with thin layers of metal (optionally partially oxidized) of the titanium type on at least one of the faces of the silver layers.

The invention relates to any glazing provided with these stacks: laminated glazing (in which the stack is deposited on one of the rigid substrates or on a flexible substrate of the polyethylene terephthalate (PET) type which is joined to the two rigid substrates by thermoplastic sheets); so-called asymmetric laminated glazing; and multiple glazing of the double-glazing type, preferably with the stack on the 2 face or on the 3 face of the glazing (conventionally numbering the faces of the substrates from the outermost face to the innermost face of the glazing once it has been mounted in a room). The invention relates more particularly to double glazing which has:

a light transmission $T_L$ of at most 75%, especially at most 70% or 65%, especially of at least 40%, or between 55 and 65% or between 45 and 55%, especially in the region of 50% and 60%, and/or an external light reflection $R_L$ of less than or equal to 20%, especially at most 17%, and/or a* and b* values in external light reflection of less than or equal to 1, preferably negative values, even after having undergone heat treatments of the toughening type), more particularly in the case of stacks consisting of two silver layers.

The key point of the invention is therefore that the layer absorbent in the visible, inserted particularly in conventional stacks, allows the light transmission thereof to be adjusted without any optical change in the case of heat treatment and/or without disturbing the appearance of the substrate in reflection.

Advantageously, the absorbent layer(s) according to the invention has (have) an intrinsic Light absorption of at least 3%, especially between 4 and 15% or between 6 and 12% (each or all of the said absorbent layers if the invention uses several of them).

The invention will be described in greater detail with the aid of the following examples.

In all the examples, the stacks are deposited on a substrate made of 6 mm thick clear silica-soda-lime glass. The substrate is then mounted as double glazing with a second substrate of identical glass, so that the stack is on the 2 face and the cavity between the 2 glass panes is filled with argon and is 12 mm in thickness. Such glazing is essentially intended for buildings, as thermal insulation and/or solar control glazing.

In all the examples, a first arrangement is made in the form of double glazing with the glass provided with non-toughened layers and then a second arrangement in which the glass, once it has been provided with the multilayer stack, has undergone a toughening operation under the standard conditions in the field (comprising heating the glass to 640° C. for several minutes).

All the layers of the stacks are deposited by sputtering assisted by a magnetic field: (oxide layers by reactive sputtering in the presence of oxygen using metal targets or optionally substoichiometric ceramic targets, the nitride layers by reactive sputtering in the presence of nitrogen).

COMPARATIVE EXAMPLE 1

The multilayer stack was the following (the table below gives the thicknesses of the layers in nanometers):

|  | Comparative Example 1 |
|---|---|
| Glass | nm |
| $Si_3N_4$ | 31 |
| ZnO | 10 |
| Ag | 9.5 |
| Ti | 0.8 |
| ZnO | 10 |
| $Si_3N_4$ | 64 |
| ZnO | 10 |
| Ag | 17.5 |
| Ti | 0.8 |
| ZnO | 10 |
| $Si_3N_4$ | 21.5 |

It is comparative since it has no layer absorbent in the visible between two dielectric layers. The two titanium layers above the silver layers are very thin and will oxidize (at least partially) during deposition of the next layer made of ZnO (just as in the following examples).

EXAMPLES 2 AND 3 ACCORDING TO THE INVENTION

The examples repeat the stack of Example 1, with the addition of a titanium nitride layer "in the middle" of the $Si_3N_4$ layer of the dielectric coating lying between the two silver layers. This is the first variant of the invention, in which the absorbent layer is protected from oxidation by the two layers which surround it.

The table below gives the thicknesses in nm of each of the layers.

|  | Example 2 | Example 3 |
|---|---|---|
| Glass | — | — |
| $Si_3N_4$ | 31 | 31 |
| ZnO | 10 | 10 |
| Ag | 9.5 | 9.5 |
| Ti | 0.8 | 0.8 |
| ZnO | 10 | 10 |
| $Si_3N_4$ | 32 | 32 |
| TiN | 0.7 | 1.4 |
| $Si_3N_4$ | 32 | 32 |
| ZnO | 10 | 10 |

-continued

|  | Example 2 | Example 3 |
|---|---|---|
| Ag | 17.5 | 17.5 |
| Ti | 0.8 | 0.8 |
| ZnO | 10 | 10 |
| $Si_3N_4$ | 21.5 | 21.5 |

The table below gives, for each of Examples 1 to 3, the following data:
- the transmission $T_L$ in % under illuminant D65;
- the dominant wavelength $\lambda_D$ in transmission, in nm;
- the external light reflection value $R_{L,ext}$ in %;
- the a* and b* values in light reflection according to the ($L^*,a^*,b^*$) colorimetry system; and
- the solar factor SF, according to a DIN standard.

These values are given in the case of double glazing with no toughening of the multilayer-coated glass ("no toughening") and in the case of double glazing with toughened multilayer-coated glass ("with toughening").

| Examples | $T_L$ | $\lambda_D$ | $R_{L,ext}$ | a* | b* | SF |
|---|---|---|---|---|---|---|
| Comparative Example 1 |  |  |  |  |  |  |
| Without toughening | 63.4 | 516 | 17.1 | −4.4 | −3.5 | 34 |
| With toughening | 65.3 | 508 | 21.1 | −3.8 | −4.7 | 34 |
| Example 2 |  |  |  |  |  |  |
| Without toughening | 60.2 | 496 | 16.4 | −3.9 | 0.7 | 33 |
| With toughening | 62.3 | 493 | 17.4 | −0.6 | −2.5 | 33 |
| Example 3 |  |  |  |  |  |  |
| Without toughening | 57.6 | 501 | 13.4 | −4.6 | −5.0 | 31 |
| With toughening | 59.5 | 497 | 14.5 | −2.7 | −7.8 | 31 |

The following conclusions may be drawn from this data:
- with the additional TiN layer according to the invention, it is possible for $T_L$ to be lowered in a controlled way from 2 to 7 or 8%, by consequently adjusting its thickness, while maintaining a moderate external reflection level, of markedly less than 20% (the same reduction in $T_L$ could be obtained by thickening the silver layers, but to the detriment of the external light reflection which then increases significantly;
- this adjustment may be made using a very thin layer: less than 2 nm of TiN, and therefore without significantly lengthening the cycle time to produce the stack and without significantly increasing either the cost or the complexity;
- the addition of this absorbent layer also has, as direct consequence, a reduction in SF of at least 1 to 3 points;
- even without toughening, the absorbent layer according to the invention has a beneficial effect on the external reflection, by lowering it by at least 1 to 4% (for comparable $T_L$ levels) and it makes it possible to preserve negative a* and b* values (that is to say a residual colour in reflection in the blue-greens, which is the most desirable tint at the present time); and
- all these advantages are preserved even when the stack undergoes toughening: of course, there are slight variations in $T_L$ or $R_L$, but the light reflection remains well below 20% (unlike the comparative example, in which there is an increase of almost 4% and the 20% threshold is exceeded). This is proof that the TiN layer is stable and has not changed optically (or only a little) because it is "encapsulated" between two nitrides.

It should also be noted that it may be preferable for the two nitride layers surrounding the TiN layer not to have the same thickness, the layer furthest from the substrate possibly being thicker, for example by a third (about 20, 30 or 40%), than the other layer (or vice versa).

Moreover, it should be noted that the TiN layer may be replaced with an NbN layer or with a metal layer of the Ti, Nb ou Zr type.

Finally, the large disymmetry in the thicknesses of the two silver layers should be noted, this following in particular the teaching of the aforementioned Patent EP-0 844 219.

EXAMPLES 4, 5 AND 5a

These examples are similar to Example 3, with an NbN layer (Example 4) and a TiN layer (Example 5) as absorbent layers. They are again in accordance with the first variant of the invention.

The table below gives the thicknesses in nm of each of the layers of the stack:

|  | Example 4 | Example 5 | Example 5a |
|---|---|---|---|
| Glass | — | — | — |
| $Si_3N_4$ | 31 | 31 | 29 |
| ZnO | 10 | 10 | 10 |
| Ag | 8.5 | 8.5 | 8.5 |
| Ti | 0.8 | 0.8 | 0.8 |
| ZnO | 10 | 10 | 10 |
| $Si_3N_4$ | 31 | 31 | 30 |
| Absorbent layer | NbN: 1.4 | TiN: 1.4 | TiN: 2 |
| $Si_3N_4$ | 31 | 31 | 30 |
| ZnO | 10 | 10 | 10 |
| Ag | 17.0 | 17.0 | 20.2 |
| Ti | 0.8 | 0.8 | 0.8 |
| ZnO | 10 | 10 | 10 |
| $Si_3N_4$ | 23 | 23 | 20 |

It should be noted that Examples 2 to 5a according to the invention have, after toughening, good optical quality, in particular without the occurrence of corrosion pits or small wetting defects.

The table below gives the same photometric data for these three examples as for the previous Examples 1 to 3 with the same conventions, and in addition:

the purity in transmission $P_T$ as a percentage; and the value of $\Delta E$ in reflection, having no unit, which, in the $(L^*, a^*, b^*)$ colorimetry system, is calculated according to the formula $[(a^*_f - a^*_i)^2 + (b^*_f - b^*_i)^2 + (L^*_f - L^*_i)^2]^{1/2}$ avec $a^*_i$, $b^*_i$ et $L^*_i$ being the values before toughening and $a^*_f$, $b^*_f$ and $L^*_f$ being the values after toughening.

| Examples | $T_L$ | $\lambda_D$ | $P_T$ | $R_{L,ext}$ | $a^*$ | $b^*$ | $\Delta E$ | SF |
|---|---|---|---|---|---|---|---|---|
| Example 4 | | | | | | | | |
| Before toughening | 58.5 | 537 | 3.4 | 14.2 | −1.0 | −7.8 | — | 32 |
| After toughening | 59.6 | 521 | 2.2 | 15.7 | −2.7 | −9.0 | 2.9 | 33 |
| Example 5 | | | | | | | | |
| Before toughening | 58.6 | 542 | 4.6 | 14.4 | −0.7 | −9.0 | — | 32 |
| After toughening | 60.4 | 531 | 2.8 | 16.0 | −2.1 | −10.1 | 2.7 | 33 |
| Example 5a | | | | | | | | |
| Before toughening | 49.4 | 500 | 6.4 | 16.2 | −1.9 | −5.3 | — | 26 |
| After toughening | 50.6 | 494 | 2.8 | 17.9 | −1.6 | −6.2 | — | 26 |

It should be noted that the increase in light transmission after toughening is very limited: about 1.5% with the NbN layer, about 2 or 1.2% with a TiN layer, depending on its thickness. Here again, the colour in external reflection changes little after toughening: the $a^*$ and $b^*$ values remain negative, with a reduction in the $a^*$ value of about −2 and a variation in the $b^*$ value of ±1. Example 5a is particularly good on this point, with an $a^*$ value which changes only by +0.3 and a $b^*$ value which changes only by −0.9.

EXAMPLE 6

This example is in accordance with the second variant of the invention: the absorbent layer lies within the upper dielectric coating (above the second silver layer), between an oxide layer and a nitride layer.

The table below gives the thicknesses in nm of each of the layers of the stack:

|  | Example 6 |
|---|---|
|  | nm |
| Glass |  |
| $Si_3N_4$ | 31 |
| ZnO | 10 |
| Ag | 8.5 |
| Ti | 0.8 |
| ZnO | 10 |
| $Si_3N_4$ | 62 |
| ZnO | 10 |
| Ag | 17.0 |
| Ti | 0.8 |
| ZnO | 10 |
| TiN | 1.4 |
| $Si_3N_4$ | 23 |

The glass was mounted as previously as double glazing, without toughening and then after toughening. The optical change after toughening is as follows:

$\Delta T_L = T_L$ (after toughening) $- T_L$ (before toughening) $= +2.4\%$;

$\Delta b^*$ in external reflection $= b^*$ (after toughening) $- b^*$ (before toughening) $= 2$, $R_{L,ext}$ (after toughening) $= 16.5\%$; and $T_L/SF$ ratio $=$ approximately $62-63/33$.

There is no corrosion pitting, even if the deposition parameters are not perfectly adjusted, and the dewetting defects are very small and not very numerous.

Several configurations in which the absorbent layer lies between an oxide layer and a nitride layer were tested by evaluating the optical quality of the stacks after toughening. These are the variants corresponding to Example 6 detailed below (the thicknesses of all the layers, except that of the absorbent layer, are the same as those according to Example 6):

EXAMPLE 6.1

Substrate/$Si_3N_4$/ZnO/Ag/Ti/ZnO/TiN(1 to 3 nm)/$Si_3N_4$/ZnO/Ag/Ti/ZnO/$Si_3N_4$;

EXAMPLE 6.2

Substrate/$Si_3N_4$/ZnO/Ag/Ti/ZnO/$Si_3N_4$/TiN (1 to 3 nm)/ZnO/Ag/Ti/ZnO/$Si_3N_4$;

EXAMPLE 6.3

Substrate/$Si_3N_4$/ZnO/Ag/Ti/ZnO/$Si_3N_4$/ZnO/Ag/Ti/ZnO/TiN (1 to 3 nm)/$Si_3N_4$;

EXAMPLE 6.4

Substrate/$Si_3N_4$/ZnO/Ag/Ti/ZnO/TiN(1 to 2 nm)/$Si_3N_4$/ZnO/Ag/Ti/ZnO/TiN (1 to 2nm)/$Si_3N_4$.

This example therefore uses two absorbent layers.

The optical quality of these glasses after toughening was evaluated by the density of defects of less than 2 micrometers in size and by the density of defects of at least 2 micrometers in size. The most favourable configurations are those of Example 6.3 and those of Example 6.4:

- in the case of Example 6.3, with an absorbent layer of 2 nm and 3 nm, there are no defects of more than 2 microns or less than 2 microns;
- in the case of Example 6.4, there are few defects when the two absorbent layers each have a thickness of 1 nm, and no defects if the first layer starting from the substrate has a thickness of 1 nm and the second layer a thickness of 2 nm (the configuration according to Example 6.3 may be regarded as better than that of Example 6.4, since all defects are avoided with 2 nm in one case and 2+1 nm at least in the other case);
- in the case of Example 6.2, the optimum configuration is observed with an absorbent layer of 3 nm (few defects);
- in the case of Example 6.1, the optimum configuration is also observed with an absorbent layer of 3 nm (no defects of less than 2 micrometers, few defects of at least 2 micrometers); and
- by comparison, if Example 6.1 is repeated but with the absorbent layer omitted, after toughening there is a high density both of defects of less than 2 micrometers and defects of at least 2 micrometers—an unacceptable density for a commercial product.

It may therefore be seen that two parameters are to be taken into account in order to ensure good optical quality of the stacks according to the invention after toughening: the position of the absorbent layer or layers in the stack (preferably "within" the outermost dielectric or within the intermediate dielectric of the stacks containing two silver layers) and its thickness or their thicknesses (which may vary according to the configurations, but which are preferably at least 1.5 or 2 nm, and even more in the region of 3 nm when the absorbent layer is "within" the intermediate dielectric).

It may also be seen that the presence of the absorbent layer improves the heat-treatment behaviour of the stack in its entirety.

COMPARATIVE EXAMPLE 7

This example is given for comparison, in so far as this time the absorbent layer is in direct contact with the glass:

|  | Comparative Example 7 |
| --- | --- |
| Glass | nm |
| TiN | 1.4 |
| $Si_3N_4$ | 31 |
| ZnO | 10 |
| Ag | 8.5 |
| Ti | 0.8 |
| ZnO | 10 |
| $Si_3N_4$ | 62 |
| ZnO | 10 |
| Ag | 17.8 |
| Ti | 0.8 |
| ZnO | 10 |
| $Si_3N_4$ | 23 |

Again, the glass is mounted as double glazing, without toughening and then after toughening: $\Delta T_L$=+4%, $\Delta b^*$ in external reflection=−2 to −3; optical quality very poor—extensive corrosion pitting.

This example demonstrates that placing the layer directly in contact with the glass has a disastrous impact on the optical quality of the glass after toughening, with a significant increase in $T_L$.

In conclusion, inserting a layer absorbent in the visible (and beyond) between nitride-type and/or oxide-type dielectrics allows fine control of the light transmission and a reduction in SF, without the optical perturbations that one might fear, most particularly in external reflection and most particularly when the layers undergo a heat treatment: limited overall optical change in the stack in the case of toughening (less than +/−3% or even +/−2% in $T_L$); preservation of a moderate level of external reflection and of satisfactory colorimetric response in external reflection; and satisfactory optical quality after toughening.

Glazing consisting of a substrate provided with the stack according to the invention may also include one or more other functionalities: they may include, for example, an anti-soiling coating based on photocatalytic $TiO_2$, a hydrophobic coating based on a fluoropolymer, a hydrophilic coating based on $SiO_2$ or SiOC, or one or more anti-reflection coatings. These coatings are preferably placed on at least one of the external faces of the glazing (on the faces turned towards the outside, as opposed to the faces turned towards the internal thermoplastic sheet in the case of a laminated glass or to the faces turned towards the air cavity or the gas or vacuum cavity in the case of insulating glazing).

The stack according to the invention may also be a heating stack, with the appropriate electrical supply and connections.

The invention claimed is:

1. A glazing, comprising:
   a transparent substrate and a stack of thin layers present on the substrate,
   wherein the stack of thin layers comprises
   (i) n functional layers having reflection properties in the infrared and/or solar radiation range, wherein n is an integer of 1 or greater;
   (ii) n+1 coating layers each comprising two or more dielectric layers, wherein each dielectric layer independently comprises a dielectric material, and wherein each functional layer is between two coating layers, and
   (iii) at least one absorbent layer that absorbs visible light, wherein the absorbent layer is between and in direct contact with two dielectric layers of a single coating layer, and wherein the absorbent layer is a metal or a metal alloy comprising Ti, Nb, Zr, or NiCr; a metal oxide selected from the group consisting of chromium oxide, iron oxide, substoichometric titanium oxide, and substoichometric zinc oxide; or a metal nitride selected from the group consisting of titanium nitride, niobium nitride, zirconium nitride, chromium nitride, and NiCr nitride.

2. The glazing of claim 1, wherein n is 1.

3. The glazing of claim 1, wherein n is 2.

4. The glazing of claim 1, wherein at least one functional layer comprises silver or a metal alloy comprising silver.

5. The glazing of claim 1, wherein at least one of the dielectric layers comprises aluminum nitride or silicon nitride.

6. The glazing of claim 5, wherein each of the dielectric layers comprises aluminum nitride or silicon nitride.

7. The glazing of claim 5, wherein the absorbent layer is disposed between a dielectric layer that comprises a metal oxide and a dielectric layer that comprises aluminum nitride or silicon nitride.

8. The glazing of claim 1, wherein at least one of the thin layers further comprises a layer selected from the group consisting of zinc oxide, tin oxide, titanium oxide, silicon oxide, tantalum oxide, niobium oxide, zirconium oxide, and mixtures thereof.

9. The glazing of claim 1, wherein at least one functional layer contacts a layer of zinc oxide.

10. The glazing of claim 1, wherein at least one of the dielectric layers comprises silicon nitride and/or aluminum nitride.

11. The glazing of claim 1, further comprising a layer of metal or metal suboxide disposed between each functional layer and at least one of the dielectric layers that the functional layer is disposed between.

12. The glazing of claim 11, wherein the layer of metal or metal suboxide is selected from the group consisting of titanium, niobium and nickel-chromium, and has a thickness of less than 2 nm.

13. The glazing of claim 1, wherein the stack of thin layers comprises two functional layers comprising silver and the absorbent layer is disposed between the two functional layers comprising silver.

14. The glazing of claim 1, wherein the glazing is a laminated glazing, an asymmetrical glazing, or a multiple glazing of the double-glazing type.

15. The glazing of claim 14, wherein the glazing is a double-type glazing, the stack includes two functional layers comprising silver, has a light transmission $T_L$ less than or equal to 65 percent, an external reflection $R_L$ less than or equal to 20 percent, and a* and b* values for external light reflection of less than or equal to 1.

16. The glazing of claim 15, wherein the light transmission $T_L$ ranges from 40 to 65 percent, the external reflection $R_L$ is less than 17 percent, and the a* and b* values for external light reflection are negative.

17. The glazing of claim 1, wherein the absorbent layer has an intrinsic light absorption of at least 3 percent.

18. The glazing of claim 17, wherein the absorbent layer has an intrinsic light absorption of from 6 to 12 percent.

19. The glazing of claim 1, wherein there is substantially no change in the optical properties of the stack of thin layers when the glazing is heat treated to anneal, bend, or toughen the glazing.

20. The glazing of claim 1, further comprising an anti-soiling coating, a hydrophobic coating, a hydrophilic coating, or an anti-reflection coating.

21. The glazing of claim 1, wherein the functional layer is directly adjacent to and in continuous contact with the dielectric layers of two coating layers, and the absorbent layers are in direct and continuous contact with two of the dielectric layers of the coating layers.

22. The glazing of claim 1, wherein the absorbent layer is encapsulated in two dielectric layers and the functional layer is encapsulated in two coating layers.

23. A glazing, comprising:

a transparent substrate and a stack of thin layers present on the substrate, wherein the stack of thin layers comprises (i) n functional layers having reflection properties in the infrared and/or solar radiation range, wherein n is an integer of 1 or greater;

(ii) n+1 coating layers each comprising two or more dielectric layers, wherein each dielectric layer independently comprises a dielectric material, and wherein each functional layer is between two coating layers, and (iii) at least one absorbent layer that absorbs visible light, wherein the absorbent layer is between and in direct contact with two dielectric layers of a single coating layer, wherein the at least one absorbent layer is a metal or a metal alloy comprising Ti, Nb, Zr, or NiCr; a metal oxide selected from the group consisting of chromium oxide, iron oxide, substoichometric titanium oxide, and substoichometric zinc oxide; or a metal nitride selected from the group consisting of titanium nitride, niobium nitride, zirconium nitride, chromium nitride, and NiCr nitride, and wherein the thickness of the at least one absorbent layer is less than or equal to 7 nm.

24. A glazing, comprising:

a transparent substrate and a stack of thin layers present on the substrate, wherein the stack of thin layers comprises (i) n functional layers having reflection properties in the infrared and/or solar radiation range, wherein n is an integer of 1 or greater;

(ii) n+1 coating layers each comprising two or more dielectric layers, wherein each dielectric layer independently comprises a dielectric material, and wherein each functional layer is between two coating layers, and (iii) at least one absorbent layer that absorbs visible light, wherein the absorbent layer is between and in direct contact with two dielectric layers of a single coating layer, and wherein the thickness of the at least one absorbent layer is less than or equal to 7 nm.

25. The glazing of claim 24, wherein the thickness of the at least one absorbent layer is less than or equal to 5 nm.

26. The glazing of claim 25, wherein the thickness of the at least one absorbent layer ranges from 1 to 2 nm.

* * * * *